(12) United States Patent
Zhou et al.

(10) Patent No.: US 10,963,757 B2
(45) Date of Patent: Mar. 30, 2021

(54) NEURAL NETWORK MODEL FUSION METHOD AND ELECTRONIC DEVICE USING THE SAME

(71) Applicant: INDUSTRIAL TECHNOLOGY RESEARCH INSTITUTE, Hsinchu (TW)

(72) Inventors: Jiazheng Zhou, Taipei (TW); Ming-Shan Deng, Taichung (TW); Xuan-Yi Lin, Taichung (TW); Ya-Wen Lee, Chiayi (TW); Shih-Fang Chang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 109 days.

(21) Appl. No.: 16/220,137

(22) Filed: Dec. 14, 2018

(65) Prior Publication Data
US 2020/0193244 A1    Jun. 18, 2020

(51) Int. Cl.
*G06K 9/62* (2006.01)
*G06T 7/00* (2017.01)
*G06N 3/04* (2006.01)

(52) U.S. Cl.
CPC .......... *G06K 9/6289* (2013.01); *G06K 9/628* (2013.01); *G06N 3/0454* (2013.01); *G06T 7/0012* (2013.01)

(58) Field of Classification Search
CPC .... G06K 9/6289; G06K 9/628; G06K 9/6271; G06K 9/6292; G06K 9/4628;
(Continued)

(56) References Cited

U.S. PATENT DOCUMENTS 7,676,076 B2 * 3/2010 Spahn .................. G06T 5/40
                                                      382/132
8,879,813 B1    11/2014 Solanki et al.
(Continued)

FOREIGN PATENT DOCUMENTS

CN    101068498 A    11/2007
CN    104392444 A    3/2015
(Continued)

OTHER PUBLICATIONS

Akilan et al., "A Late Fusion Approach for Harnessing Multi-CNN Model High-level Features", 2017 IEEE International Conference on Systems, Man, and Cybernetics (SMC), Banff Center, Banff, Canada, Oct. 5-8, 2017, pp. 566-571 (6 pages).
(Continued)

*Primary Examiner* — Michael S Osinski
(74) *Attorney, Agent, or Firm* — Birch, Stewart, Kolasch & Birch, LLP

(57) ABSTRACT

A neural network model fusion method and an electronic device using the same are provided. The neural network model fusion method includes the following steps. An image is received. The image is analyzed through several neural network models. The neural network models include at least two of a degree classification model, a multi-class identification model and an object detection model. Several analysis results are obtained according to the neural network models. These analysis results are converted into a number of conversion factors. The conversion factors are inputted into a fusion model to obtain a fusion result.

18 Claims, 9 Drawing Sheets

(58) Field of Classification Search
CPC .. G06K 9/6256; G06K 9/6267; G06K 9/6262; G06K 9/46; G06K 9/00624; G06K 9/00771; G06K 9/6268; G06K 9/6273; G06K 9/6274; G06K 9/66; G06K 9/3241; G06K 9/6247; G06T 7/0012; G06T 7/11; G06T 7/73; G06T 2207/20081; G06T 2207/20084; G06T 2207/10004; G06N 3/0454; G06N 3/08; G06N 3/084; G06N 3/0445; G06N 20/00; G06N 20/10; G06N 20/20

See application file for complete search history.

(56) References Cited

U.S. PATENT DOCUMENTS

| | | | |
|---|---|---|---|
| 9,445,716 B2 | 9/2016 | Liu et al. | |
| 9,524,450 B2 | 12/2016 | Ravindran et al. | |
| 9,589,374 B1 | 3/2017 | Gao et al. | |
| 9,922,272 B2 | 3/2018 | Cheng et al. | |
| 10,019,654 B1* | 7/2018 | Pisoni | G06K 9/6273 |
| 10,068,171 B2* | 9/2018 | Wshah | G06N 3/0454 |
| 10,198,655 B2* | 2/2019 | Hotson | G01S 13/931 |
| 10,297,070 B1* | 5/2019 | Zhu | G06K 9/6256 |
| 10,657,364 B2* | 5/2020 | El-Khamy | G06K 9/6277 |
| 2003/0225719 A1* | 12/2003 | Juang | G10L 17/04 706/48 |
| 2004/0061777 A1* | 4/2004 | Sadok | G08B 17/125 348/83 |
| 2004/0252878 A1* | 12/2004 | Okuda | G06T 7/0006 382/145 |
| 2006/0245631 A1* | 11/2006 | Levenson | G06K 9/6284 382/133 |
| 2008/0292194 A1 | 11/2008 | Schmidt et al. | |
| 2013/0156320 A1* | 6/2013 | Fredembach | G06K 9/4652 382/190 |
| 2015/0010218 A1* | 1/2015 | Bayer | G06K 9/80 382/128 |
| 2015/0170002 A1* | 6/2015 | Szegedy | G06K 9/4628 382/156 |
| 2015/0363643 A1* | 12/2015 | Huber | G06T 11/60 382/103 |
| 2016/0259994 A1 | 9/2016 | Ravindran et al. | |
| 2016/0292856 A1 | 10/2016 | Niemeijer et al. | |
| 2017/0112372 A1 | 4/2017 | Chakravorty et al. | |
| 2017/0140253 A1* | 5/2017 | Wshah | G06N 3/0454 |
| 2017/0270653 A1* | 9/2017 | Garnavi | G06N 20/20 |
| 2017/0270674 A1* | 9/2017 | Shrivastava | G06T 11/60 |
| 2018/0012107 A1* | 1/2018 | Xu | G06K 9/6267 |
| 2018/0047159 A1 | 2/2018 | Schlegl et al. | |
| 2018/0089505 A1* | 3/2018 | El-Khamy | G06T 7/73 |
| 2018/0122068 A1 | 5/2018 | Garnavi et al. | |
| 2018/0130203 A1* | 5/2018 | Abedini | G06T 7/0012 |
| 2018/0165809 A1 | 6/2018 | Stanitsas et al. | |
| 2018/0165810 A1 | 6/2018 | Jia et al. | |
| 2018/0189613 A1* | 7/2018 | Wolf | G06K 9/6202 |
| 2018/0204111 A1 | 7/2018 | Zadeh et al. | |
| 2018/0211403 A1* | 7/2018 | Hotson | G06T 7/60 |
| 2018/0214087 A1 | 8/2018 | Balaji et al. | |
| 2019/0019318 A1* | 1/2019 | Cinnamon | G06T 7/001 |
| 2019/0122071 A1* | 4/2019 | Jin | G06K 9/00268 |
| 2019/0130216 A1* | 5/2019 | Tomioka | G06K 9/6267 |
| 2019/0164290 A1* | 5/2019 | Wang | G06F 16/55 |
| 2019/0236411 A1* | 8/2019 | Zhu | G06K 9/6292 |
| 2019/0392263 A1* | 12/2019 | Ferrari | G06K 9/628 |
| 2019/0392318 A1* | 12/2019 | Ghafoor | G06K 9/6256 |
| 2020/0074238 A1* | 3/2020 | Umeno | G06K 9/6267 |
| 2020/0074243 A1* | 3/2020 | Gu | G06K 9/6267 |
| 2020/0097756 A1* | 3/2020 | Hashimoto | G06K 9/3233 |
| 2020/0117954 A1* | 4/2020 | Jiang | G06N 3/0454 |
| 2020/0117959 A1* | 4/2020 | Sargent | G06K 9/685 |
| 2020/0125923 A1* | 4/2020 | Jones | G06K 9/00771 |
| 2020/0134380 A1* | 4/2020 | Xu | G06N 3/088 |
| 2020/0143160 A1* | 5/2020 | Liu | G06K 9/628 |
| 2020/0193207 A1* | 6/2020 | Kim | G06K 9/62 |

FOREIGN PATENT DOCUMENTS

| | | |
|---|---|---|
| CN | 106408562 A | 2/2017 |
| CN | 106793992 A | 5/2017 |
| CN | 107203778 A | 9/2017 |
| CN | 107256550 A | 10/2017 |
| CN | 107292887 A | 10/2017 |
| CN | 107330449 A | 11/2017 |
| CN | 107330876 A | 11/2017 |
| CN | 104603630 B | 12/2017 |
| CN | 107437092 A | 12/2017 |
| CN | 107704886 A | 2/2018 |
| CN | 107967688 A | 4/2018 |
| CN | 108021916 A | 5/2018 |
| CN | 108198620 A | 6/2018 |
| CN | 107358606 B | 7/2018 |
| CN | 108363704 A | 8/2018 |
| CN | 108363714 A | 8/2018 |
| EP | 2285266 B1 | 4/2014 |
| EP | 3121789 B1 | 1/2018 |
| JP | 6177314 B2 | 8/2017 |
| TW | 514513 B | 12/2002 |
| TW | 201503106 A | 1/2015 |
| TW | M527991 U | 9/2016 |
| WO | WO 00/14668 A1 | 3/2000 |
| WO | WO 2016/040317 A1 | 3/2016 |
| WO | WO 2016/132152 A1 | 8/2016 |
| WO | WO 2016/134211 A1 | 8/2016 |
| WO | WO 2017/092615 A1 | 6/2017 |
| WO | WO 2017/147418 A1 | 8/2017 |
| WO | WO 2017/210690 A1 | 12/2017 |
| WO | WO 2017/222849 A1 | 12/2017 |
| WO | WO 2018/022523 A2 | 2/2018 |
| WO | WO 2018/044872 A1 | 3/2018 |
| WO | WO 2018/045269 A1 | 3/2018 |
| WO | WO 2018/093865 A1 | 5/2018 |
| WO | WO 2018/118373 A1 | 6/2018 |
| WO | WO 2018/120644 A1 | 7/2018 |
| WO | WO 2018/132336 A1 | 7/2018 |

OTHER PUBLICATIONS

Akram et al., "Detection and classification of retinal lesions for grading of diabetic retinopathy", Computers in Biology and Medicine, vol. 45, 2014, pp. 161-171 (11 pages).

American Academy of Opthalmology Retina/Vitreous Panel, Preferred Practice Pattern® Guidelines, "Diabetic Retinopathy", American Academy of Opthalmology, San Francisco, CA, 2016, 63 pages.

Lavinia et al., "Fusion Based Deep CNN for Improved Large-Scale Image Action Recognition", 2016 IEEE International Symposium on Multimedia, IEEE Computer Society, 2016, pp. 609-614 (6 pages).

* cited by examiner

NEURAL NETWORK MODEL FUSION METHOD AND ELECTRONIC DEVICE USING THE SAME

TECHNICAL FIELD

The disclosure relates in general to a neural network model fusion method and an electronic device using the same.

BACKGROUND

Image recognition technology has a wide range of application. Particularly, application fields, such as medical image analysis, information security control and crime investigation, require the use of image recognition technology with high accuracy.

Take medical image analysis for example. Currently, the interpretation of medical images employs a severity classification model, but the accuracy is usually not high enough. It would be a great benefit to the patients if the image recognition technology can provide higher accuracy. Therefore, the research personnel in both the medical and the engineering fields are dedicated to the above regard.

SUMMARY

The disclosure is directed to a neural network model fusion method and an electronic device using the same.

According to one embodiment, a neural network model fusion method is provided. The neural network model fusion method includes the following steps. An image is received. The image is analyzed through several neural network models. The neural network models include at least two of a degree classification model, a multi-class identification model and an object detection model. Several analysis results are obtained according to the neural network models. These analysis results are converted into a number of conversion factors. The conversion factors are inputted into a fusion model to obtain a fusion result.

According to another embodiment, an electronic device is provided. The electronic device includes a processor configured to perform a neural network model fusion method. The neural network model fusion method includes the following steps. An image is received. The image is analyzed through several neural network models. The neural network models include at least two of a degree classification model, a multi-class identification model and an object detection model. Several analysis results are obtained according to the neural network models. These analysis results are converted into a number of conversion factors. The conversion factors are inputted into a fusion model to obtain a fusion result.

The above and other aspects of the invention will become better understood with regard to the following detailed description of the preferred but non-limiting embodiment(s). The following description is made with reference to the accompanying drawings.

Figure 1:
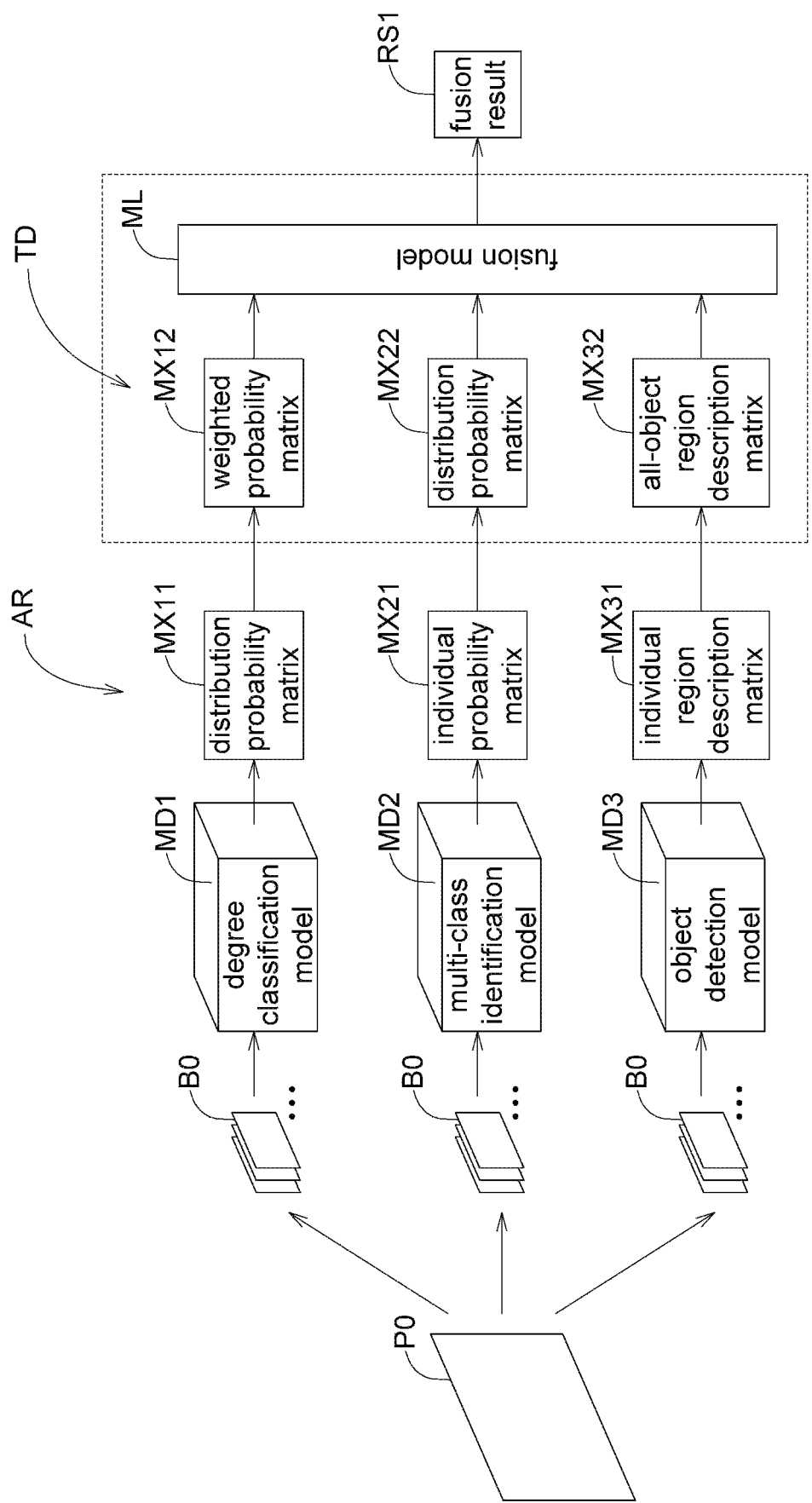
FIG. 1 is an implementation architecture of a neural network model fusion method according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments of the neural network model fusion method are disclosed below. The neural network models for different purposes, such as the degree classification model (for example, configured to classify disease severity), the multi-class identification model (for example, configured to perform multi-lesion classification for various types of lesions) and the object detection model (for example, configured to detect lesion locations), are fused through machine learning to effectively increase the performance in image recognition. Particularly, when it comes to the interpretation of medical images, the neural network model fusion method of the present disclosure effectively increases the accuracy in the classification of disease severity and the identification of lesions.

Referring to FIG. 1, an implementation architecture of a neural network model fusion method according to an embodiment is shown. An image P0 is cropped into several image blocks B0 in a cropping process, wherein the image P0 is such as a medical image, a facial image, or a monitor image, and the present invention is not limited thereto. The three neural network models include the degree classification model MD1, the multi-class identification model MD2, and the object detection model MD3. The degree classification model MD1, the multi-class identification model MD2, and the object detection model MD3 analyze the image blocks B0 to obtain several analysis results AR (for example, the classification result of disease severity, the multi-lesion classification result, and the lesion detection result). The analysis results AR are converted into a number of conversion factors TD. Then, the conversion factors TD are inputted to a fusion model ML to obtain a fusion result RS1 through machine learning.

To put it in greater details, the analysis results AR obtained by the degree classification model MD1 from the analysis of the image block B0 of the image P0 are presented as a distribution probability matrix MX11 of levels L0 to L4, and the present invention is not limited thereto. Refer to FIGS. 2A to 2E and Table 1. FIGS. 2A to 2E are examples of a distribution probability matrix MX11. Table 1 illustrates the distribution probability matrix MX11 for images P10 to P14 respectively. The quantity of levels L0 to L4 is not for limiting the scope of the present disclosure. Levels L0 to L4 may be derived from the consideration of multiple factors, including but not limited to number of lesions, size of lesions, type of lesions, distribution of lesions, and color of lesions. The values of the levels L0 to L4 are corresponding probability values of the distribution of the levels L0 to L4, and the sum of the probability values is 1. The larger the value of an element of the distribution probability matrix MX11, the more likely the image will be classified as the level corresponding to the particular element. The image will be classified as the level corresponding to the particular element of the distribution probability matrix MX11 with the maximum value.

TABLE 1

| Image | Distribution Probability Matrix MX11 [L0, L1, L2, L3, L4] |
|---|---|
| P10 | [0.9, 0.1, 0.0, 0.0, 0.0] |
| P11 | [0.1, 0.8, 0.1, 0.0, 0.0] |
| P12 | [0.0, 0.1, 0.8, 0.1, 0.0] |
| P13 | [0.0, 0.0, 0.1, 0.8, 0.1] |
| P14 | [0.0, 0.0, 0.0, 0.1, 0.9] |

Figure 2A:
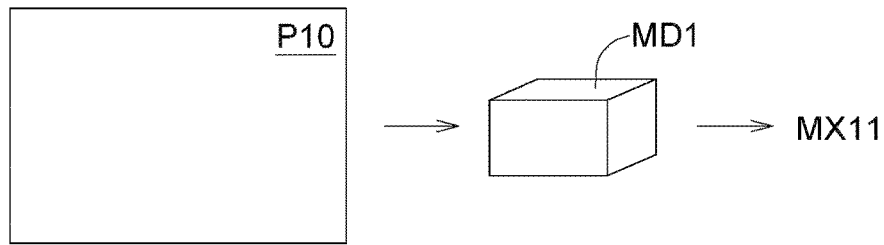
FIGS. 2A to 2E are examples of a distribution probability matrix.

As indicated in FIG. 2A, the distribution probability matrix MX11 for the image P10 not containing any lesion L is presented by [L0,L1,L2,L3,L4]=[0.9,0.1,0.0,0.0,0.0]. Since level L0 has the largest probability, the image P10 is classified as level L0.

Figure 2B:
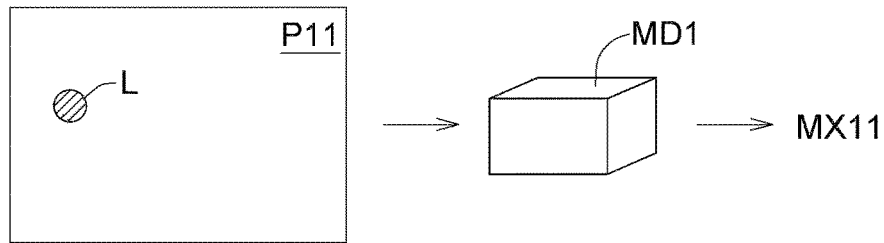

As indicated in FIG. 2B, the distribution probability matrix MX11 for the image P11 containing one lesion L is presented by [L0,L1,L2,L3,L4]=[0.1,0.8,0.1,0.0,0.0]. Since level L1 has the largest probability, the image P11 is classified as level L1.

Figure 2C:
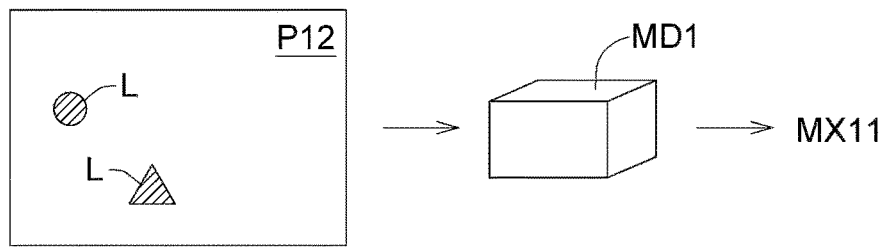

As indicated in FIG. 2C, the distribution probability matrix MX11 for the image P12 containing two lesions L is presented by [L0,L1,L2,L3,L4]=[0.0,0.1,0.8,0.1,0.0]. Since level L2 has the largest probability, the image P12 is classified as level L2.

Figure 2D:
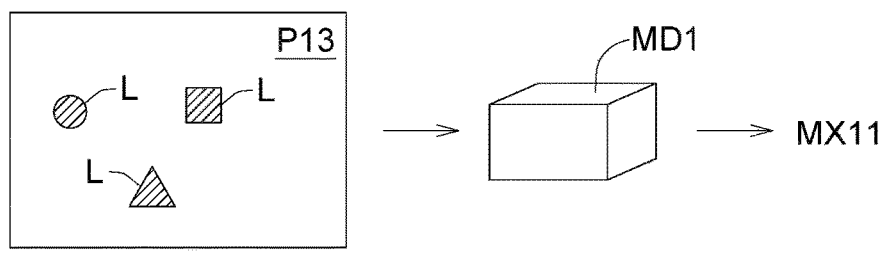

As indicated in FIG. 2D, the distribution probability matrix MX11 for the image P13 containing three lesions L is presented by [L0,L1,L2,L3,L4]=[0.0,0.0,0.1,0.8,0.1]. Since level L3 has the largest probability, the image P13 is classified as level L3.

Figure 2E:
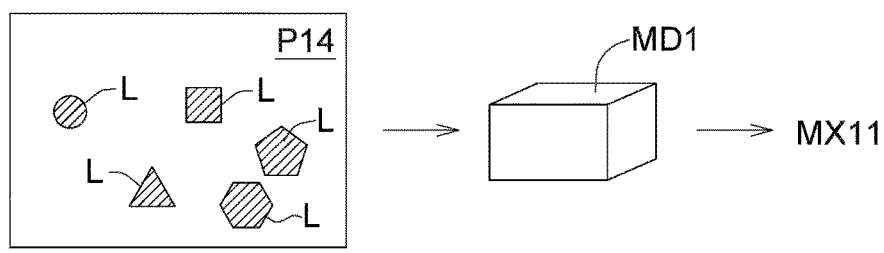

As indicated in FIG. 2E, the distribution probability matrix MX11 for the image P14 containing five lesions L is presented by [L0,L1,L2,L3,L4]=[0.0, 0.0, 0.0, 0.1,0.9]. Since level L4 has the largest probability, the image P14 is classified as level L4.

As indicated in FIG. 1, the analysis results AR obtained by the multi-class identification model MD2 from the analysis of the image block B0 of the image P0 are presented as at least one individual probability matrix MX21 of microaneurysm (MA), hemorrhage (H), hard exudate (HE), soft exudate (SE) and neovascularization (NEO), and the present invention is not limited thereto.

Refer to FIGS. 3A to 3E and Table 2. FIGS. 3A to 3E are examples of an individual probability matrix MX21. Table 2 illustrates the individual probability matrix MX21 for images P10 to P14 respectively. In the individual probability matrix MX21, the corresponding values of microaneurysm (MA), hemorrhage (H), hard exudate (HE), soft exudate (SE) and neovascularization (NEO) are the individual probability values of microaneurysm (MA), hemorrhage (H), hard exudate (HE), soft exudate (SE) and neovascularization (NEO), wherein each individual probability has a value between 0.0 to 1.0. The larger the individual probability value, the more likely the image contains the lesion.

TABLE 2

| Image | Individual Probability Matrix MX21 [MA, H, HE, SE, NEO] |
|---|---|
| P10 | [0.0, 0.0, 0.0, 0.0, 0.0] |
| P11 | [0.8, 0.0, 0.0, 0.0, 0.0] |
| P12 | [0.8, 0.9, 0.0, 0.0, 0.0] |
| P13 | [0.8, 0.9, 0.8, 0.0, 0.0] |
| P14 | [0.8, 0.9, 0.8, 0.8, 0.8] |

Figure 3A:
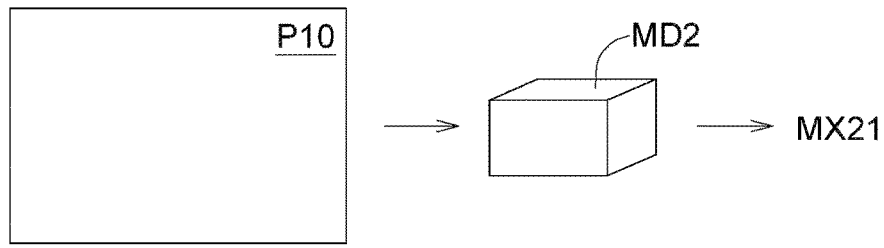
FIGS. 3A to 3E are examples of an individual probability matrix.

As indicated in FIG. 3A, the individual probability matrix MX21 for the image P10 not containing any lesion is presented by [MA, H, HE, SE, NEO]=[0.0, 0.0, 0.0, 0.0, 0.0].

Figure 3B:
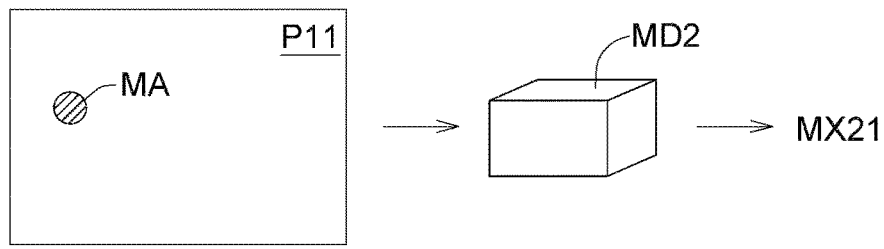

As indicated in FIG. 3B, the individual probability matrix MX21 for the image P11 containing microaneurysm (MA) is presented by [MA, H, HE, SE, NEO]=[0.8, 0.0, 0.0, 0.0, 0.0].

Figure 3C:
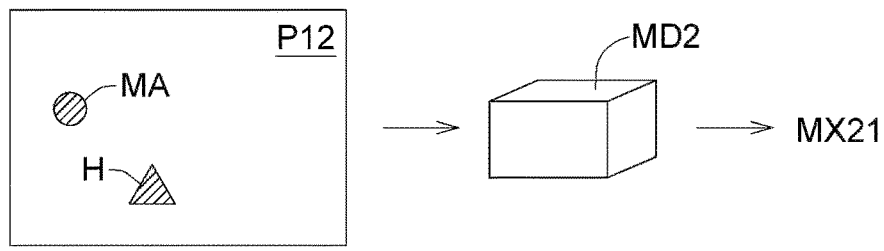

As indicated in FIG. 3C, the individual probability matrix MX21 for the image P12 containing microaneurysm (MA) and hemorrhage (H) is presented by [MA,H,HE,SE,NEO]= [0.8, 0.9, 0.0, 0.0, 0.0].

Figure 3D:
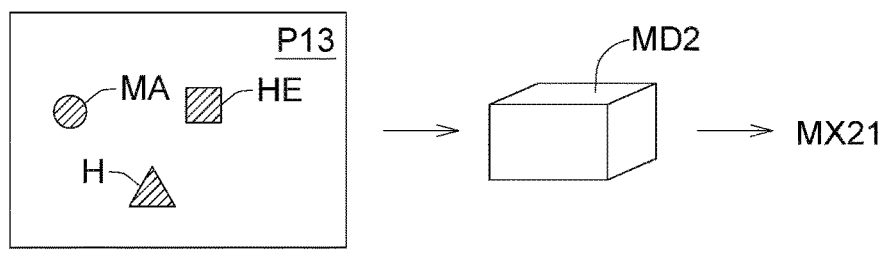

As indicated in FIG. 3D, the individual probability matrix MX21 for the image P13 containing microaneurysm (MA), hemorrhage (H) and hard exudate (HE) is presented by [MA,H,HE,SE,NEO]=[0.8, 0.9, 0.8, 0.0, 0.0].

Figure 3E:
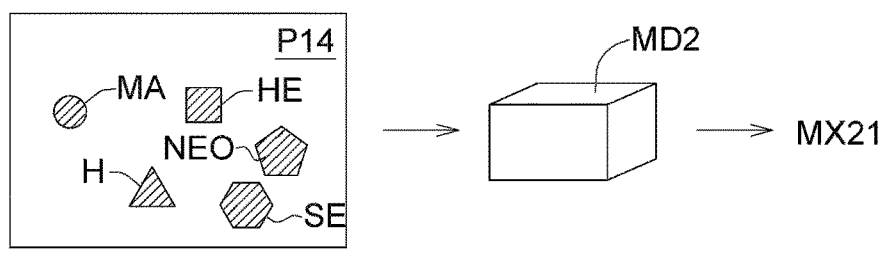

As indicated in FIG. 3E, the individual probability matrix MX21 for the image P14 containing microaneurysm (MA), hemorrhage (H), hard exudate (HE), soft exudate (SE) and neovascularization (NEO) is presented by [MA,H,HE,SE, NEO]=[0.8, 0.9, 0.8, 0.8, 0.8].

As indicated in FIG. 1, the analysis results AR obtained by the object detection model MD3 from the analysis of the image block B0 of the image P0 are presented as an individual region description matrix MX31 for the image P14 of objects, such as microaneurysm (MA), hemorrhage (H), hard exudate (HE), soft exudate (SE) and neovascularization (NEO). Refer to FIGS. 4A to 4D and Table 3. FIGS. 4A to 4D are examples of an individual region description matrix MX31. Table 3 illustrates an individual region description matrix MX31 for images P11 to P14. In the individual region description matrix MX31, LC represents lesion type, X represents a horizontal coordinate of a region starting point, Y represents a vertical coordinate of a region starting point, W represents a region width, H represents a region height, C represents a confidence level, and the present invention is not limited thereto. In the coordinate system, the top left corner represents an original point (0, 0), and the horizontal axis to the right of the original point (0, 0) and the vertical axis below the original point (0, 0) have positive values.

TABLE 3

| Image | Individual Region description matrix MX31 [LC, X, Y, W, H, C] . . . |
|---|---|
| P11 | [0, 5, 5, 2, 2, 0.90] |
| P12 | [0, 5, 5, 2, 2, 0.90] |
|  | [1, 9, 9, 3, 3, 0.92] |
| P13 | [0, 5, 5, 2, 2, 0.90] |
|  | [1, 9, 9, 3, 3, 0.92] |
|  | [2, 4, 10, 2, 2, 0.8] |

TABLE 3-continued

| Image | Individual Region description matrix MX31 [LC, X, Y, W, H, C] . . . |
|---|---|
| P14 | [0, 5, 5, 2, 2, 0.90] |
|  | [1, 9, 9, 3, 3, 0.92] |
|  | [2, 4, 10, 2, 2, 0.8] |
|  | [3, 14, 8, 3, 3, 0.8] |
|  | [4, 13, 12, 2, 2, 0.9] |

Figure 4A:
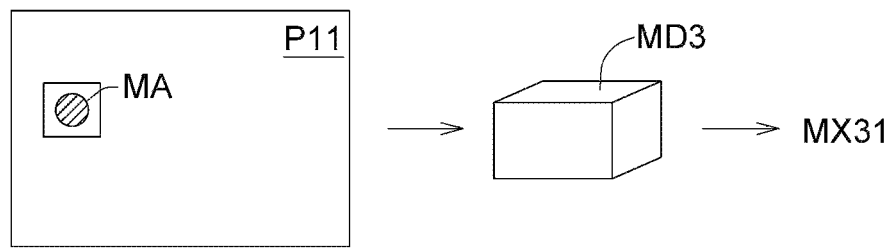
FIGS. 4A to 4D are examples of an individual region description matrix.

As indicated in FIG. 4A, the individual region description matrix MX31 for the image P11 containing microaneurysm (MA) is presented by [LC,X,Y,W,H,C] . . . =[0,5,5,2,2,0.90].

Figure 4B:
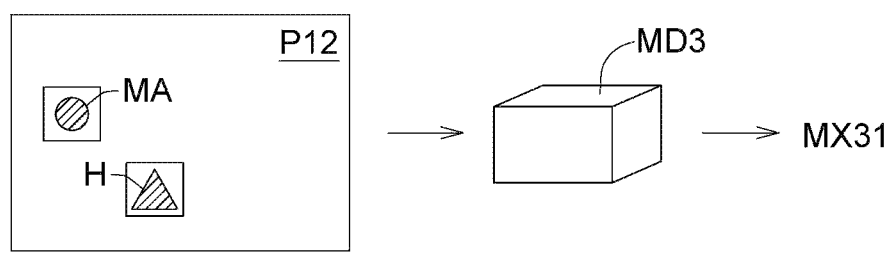

As indicated in FIG. 4B, the individual region description matrix MX31 for the image P12 containing microaneurysm (MA) and hemorrhage (H) is presented by [LC,X,Y,W,H,C] . . . =[0,5,5,2,2,0.90], [1,9,9,3,3,0.92].

Figure 4C:
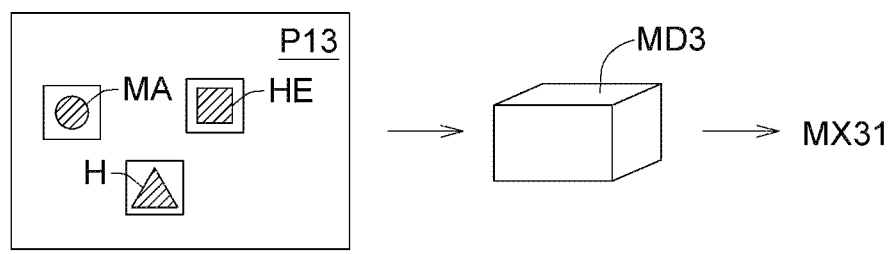

As indicated in FIG. 4C, the individual region description matrix MX31 for the image P13 containing microaneurysm (MA), hemorrhage (H) and hard exudate (HE) is presented by [LC,X,Y,W,H,C] . . . =[0,5,5,2,2,0.90], [1,9,9,3,3,0.92], [2,4,10,2,2,0.8].

Figure 4D:
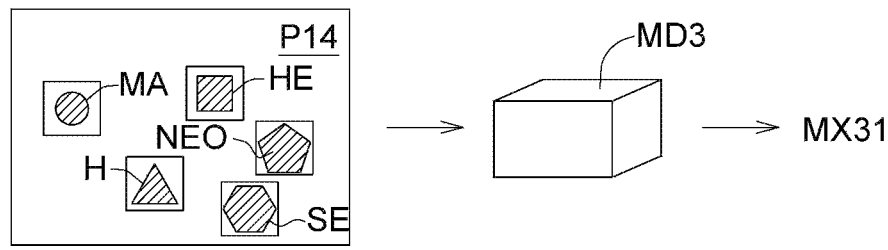

As indicated in FIG. 4D, the individual region description matrix MX31 for the image P14 containing microaneurysm (MA), hemorrhage (H), hard exudate (HE), soft exudate (SE) and neovascularization (NEO) is presented by [LC,X,Y,W,H,C] . . . =[0,5,5,2,2,0.90], [1,9,9,3,3,0.92], [2,4,10,2,2,0.8], [3,14,8,3,3,0.8], [4,13,12,2,2,0.9].

The degree classification model MD1, the multi-class identification model MD2 and the object detection model MD3 perform different types of analysis to the image P0 to obtain several analysis results AR. The neural network model fusion method of the present disclosure fuses the degree classification model MD1, the multi-class identification model MD2 and the object detection model MD3 to effectively increase the accuracy in the identification of lesions. Based on the experimental results, the analysis results AR obtained by the degree classification model MD1 alone show that the image is classified as level L1. On the other hand, when the degree classification model MD1, the multi-class identification model MD2 and the object detection model MD3 are fused together, the fusion result RS1 obtained through the fusion of the above three models shows that the image is classified as level L2 instead of L1. Since level L2 is the correct result, the interpretation accuracy is therefore increased.

Figure 5:
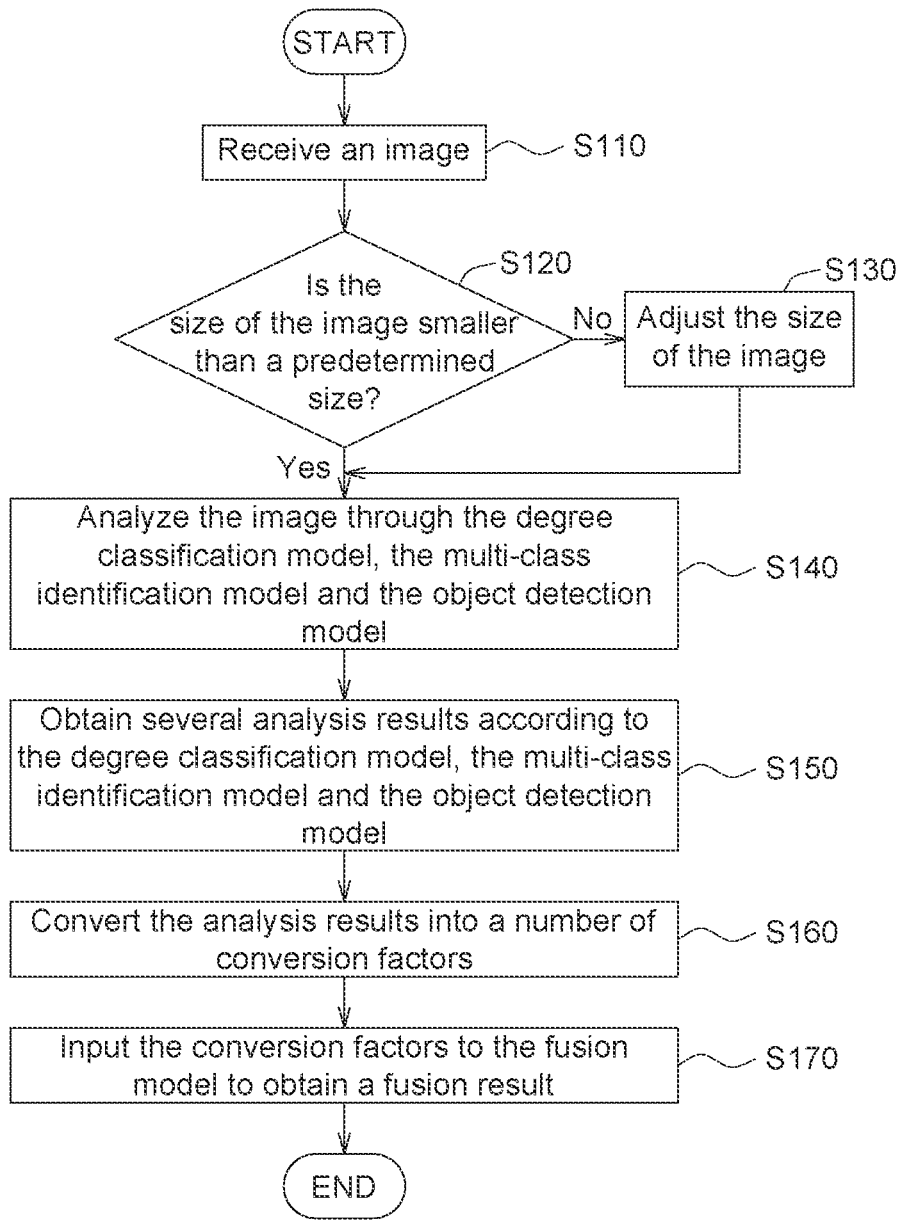
FIG. 5 is a flowchart of a neural network model fusion method according to an embodiment.
Figure 6:
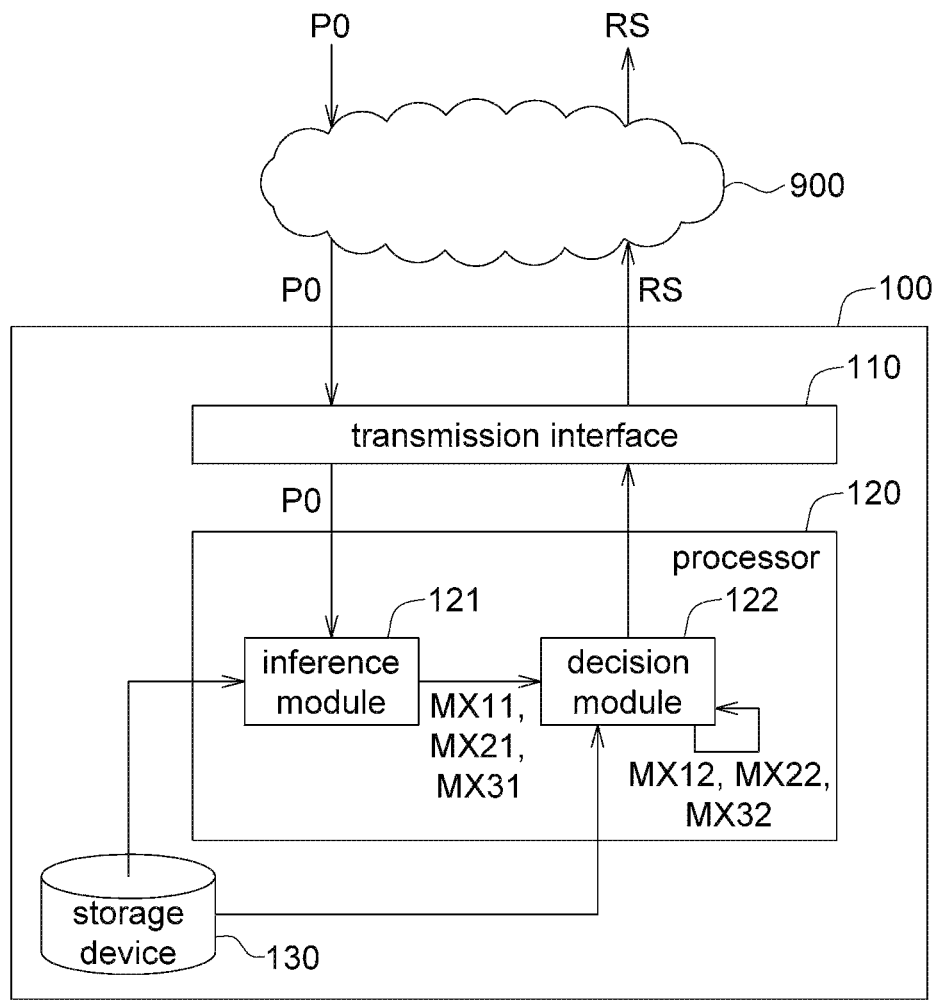
FIG. 6 is a schematic diagram of an electronic device according to an embodiment.

Refer to FIG. 5 and FIG. 6. FIG. 5 is a flowchart of a neural network model fusion method according to an embodiment. FIG. 6 is a schematic diagram of an electronic device according to an embodiment. The electronic device 100 can be realized by such as a personal computer, a tablet, a laptop or a server, but the invention is not limited thereto. The electronic device 100 includes a transmission interface 110, a processor 120 and a storage device 130. The transmission interface 110 can be realized by such as a wired network module or a wireless network module, but the invention is not limited thereto. The storage device 130 can be realized by a hard disc, or a memory. The processor 120 can be realized by a central processor, or a graphics processor, but the invention is not limited thereto. The processor 120 includes an inference module 121 and a decision module 122. The neural network model fusion method can be implemented through the processor 120 of the electronic device 100 of FIG. 6.

In step S110, an image P0 is provided, wherein the image P0 is transmitted to the transmission interface 110 through a network 900.

Then, the method proceeds to step S120, whether the size of the image P0 is smaller than a predetermined size is determined by the inference module 121. If the size of the image P0 is smaller than predetermined size, then the method proceeds to step S130.

Then, the method proceeds to step S130, the size of the image P0 is adjusted by the inference module 121 to match the predetermined size.

Then, the method proceeds to step S140, the image P0 is analyzed by the inference module 121 through the degree classification model MD1, the multi-class identification model MD2 and the object detection model MD3. Step S140 includes: analyzing the image P0 by the inference module 121 through the degree classification model MD; analyzing the image P0 by the inference module 121 through the multi-class identification model MD2; and analyzing the image P0 by the inference module 121 through the object detection model MD3.

Then, the method proceeds to step S150, several analysis results AR are obtained by the inference module 121 according to the degree classification model MD1, the multi-class identification model MD2 and the object detection model MD3.

Then, the method proceeds to step S160, the analysis results AR are converted into a number of conversion factors TD by the decision module 122. Refer to Table 4. The analysis results AR obtained by the degree classification model MD1 are presented as a distribution probability matrix MX11. The distribution probability matrix MX11 is element-wise multiplied by a weight matrix (the weight matrix is exemplified by [1, 2, 3, 4, 5]; however, this exemplification is not for limiting the scope of the present disclosure) to obtain a weighted probability matrix MX12 used as the conversion factors TD of the degree classification model MD11. The element-wise multiplication of the distribution probability matrix MX11 and the weight matrix is a product of corresponding elements between the distribution probability matrix MX11 and the weight matrix. The weight matrix can suitably emphasize the importance of each of the levels L0 to L4. Based on experience, the content of the weight matrix can be emphasized according to the application to serve the needs in different scenario.

TABLE 4

| Distribution Probability Matrix MX11 [L0, L1, L2, L3, L4] | Weighted Probability Matrix MX12 [L0, L1, L2, L3, L4] |
|---|---|
| [0.1, 0.1, 0.8, 0.0, 0.0] | [0.1, 0.2, 2.4, 0.0, 0.0] |
| [0.1, 0.2, 0.5, 0.1, 0.1] | [0.1, 0.4, 1.5, 0.4, 0.5] |
| . . . | . . . |
| [0.1, 0.7, 0.1, 0.0, 0.0] | [0.1, 1.4, 0.3, 0.0, 0.0] |

Refer to Table 5. The analysis results AR obtained by the multi-class identification model MD2 are presented as an individual probability matrix MX21. The individual probability matrix MX21 is converted into a distribution probability matrix MX22 of levels L0 to L4 through a conversion model or a correspondence table. The distribution probability matrix MX22 is used as the conversion factors TD of the multi-class identification model MD2. The distribution probability matrix MX22 of the multi-class identification model MD2 has 5 levels L0 to L4. The distribution probability matrix MX11 of the degree classification model MD1 also has 5 levels L0 to L4.

TABLE 5

| Individual Probability<br>Matrix MX21<br>[MA, H, HE, SE, NEO] | Distribution Probability<br>Matrix MX22<br>[L0, L1, L2, L3, L4] |
|---|---|
| [0.8, 0.8, 0.1, 0.0, 0.0] | [0.1, 0.1, 0.8, 0.0, 0.0] |
| [0.1, 0.2, 0.5, 0.9, 0.9] | [0.0, 0.1, 0.0, 0.1, 0.8] |
| ... | ... |
| [0.1, 0.1, 0.1, 0.0, 0.0] | [0.9, 0.1, 0.0, 0.0, 0.0] |

Refer to Table 6. The analysis results AR obtained by the object detection model MD3 are presented as an individual region description matrix MX31. The individual region description matrix MX31 is converted into an all-object region description matrix MX32 of objects such as microaneurysm (MA), hemorrhage (H), hard exudate (HE), soft exudate (SE) and neovascularization (NEO). In the all-object region description matrix MX32, A represents an object area, and N represents an object quantity.

TABLE 6

| Individual Region<br>description matrix MX31<br>[LC, X, Y, W, H, C] . . . | All-Object Region<br>description matrix MX32<br>[A, N, A, N, A, N, A, N, A, N] |
|---|---|
| [0, 20, 20, 10, 10, 0.90]<br>[1, 40, 40, 20, 20, 0.92]<br>[1, 60, 60, 20, 20, 0.95]<br>[2, 80, 80, 50, 50, 0.95]<br>[4, 10, 180, 60, 60, 0.70] | [100, 1, 800, 2, 2500, 1, 0, 0, 3600, 1] |

Then, the method proceeds to step S170, the conversion factors TD is inputted to the fusion model ML to obtain a fusion result RS1 by the decision module 122.

As disclosed above, the analysis results AR respectively obtained by the degree classification model MD1, the multi-class identification model MD2 and the object detection model MD3 can be fused through machine learning to obtain a fusion result RS1. The fusion result RS1 combines the advantages of the neural network models used for different purposes, such that the performance in image recognition can be effectively improved. Particularly when it comes to the interpretation of medical images, the neural network model fusion method of the present disclosure can effectively increase the accuracy in the classification of disease severity and the identification of lesions.

Figure 7:
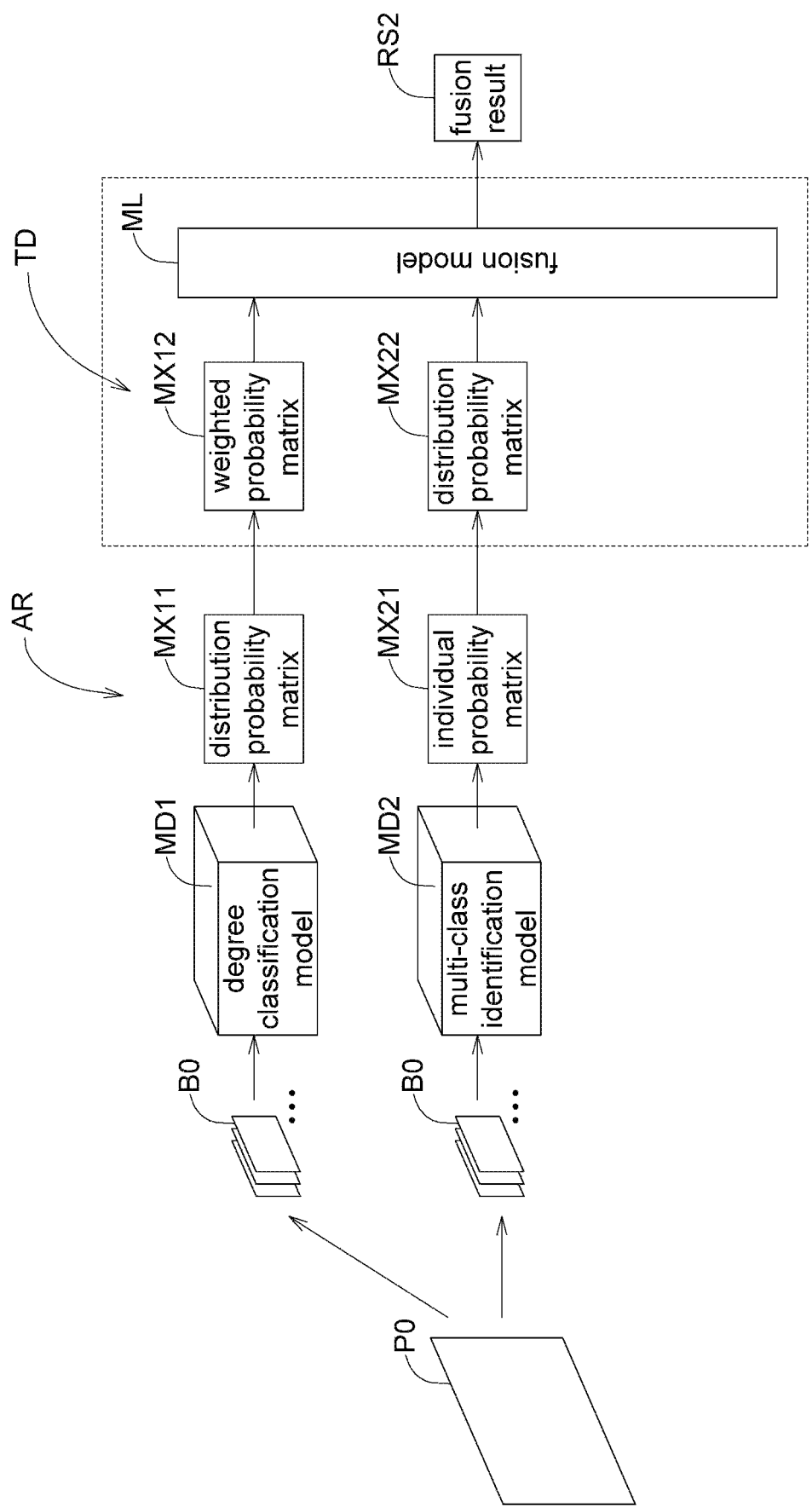
FIG. 7 is an implementation architecture of a neural network model fusion method according to another embodiment.
Figure 8:
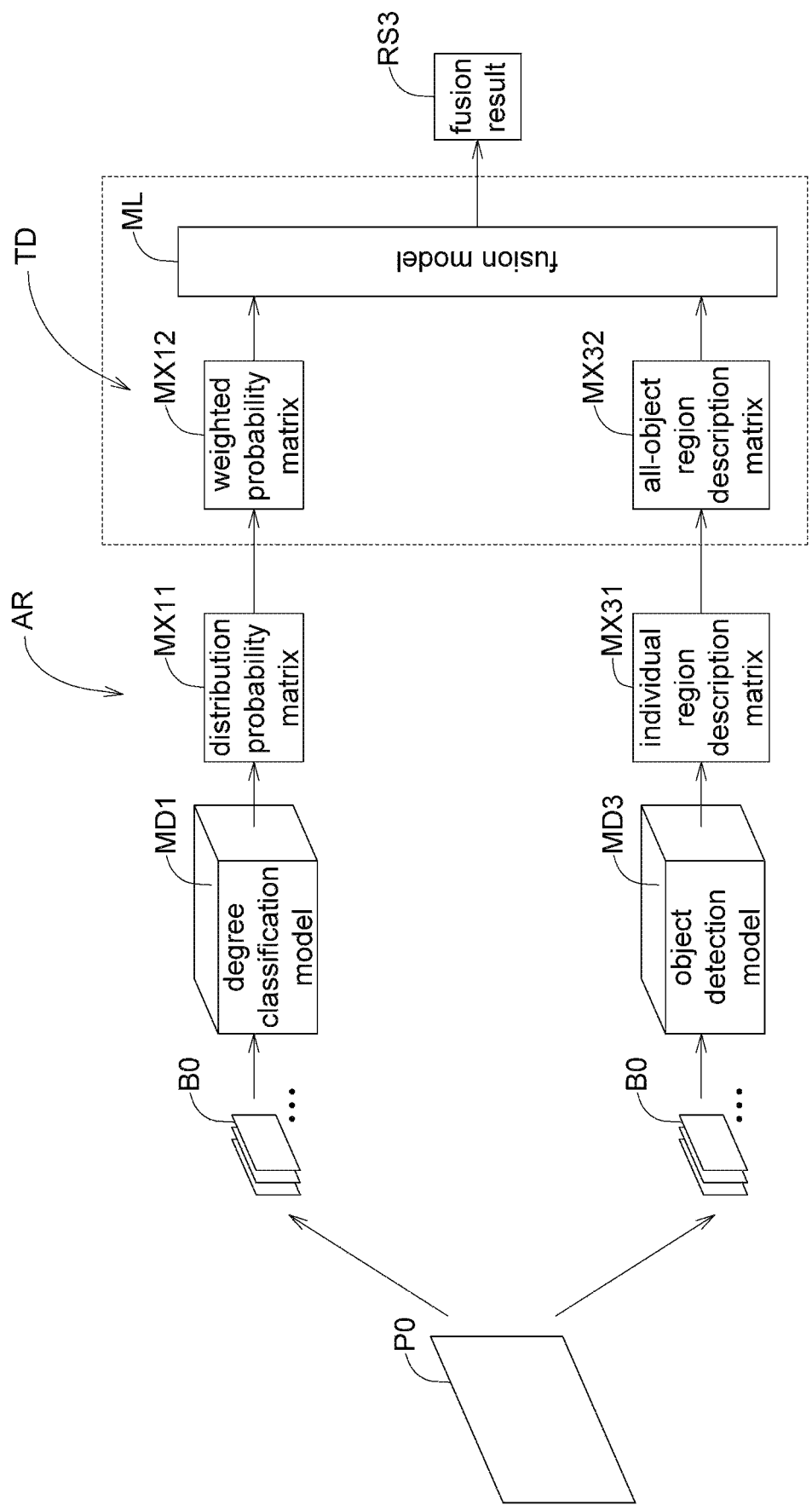
FIG. 8 is an implementation architecture of a neural network model fusion method according to another embodiment.
Figure 9:
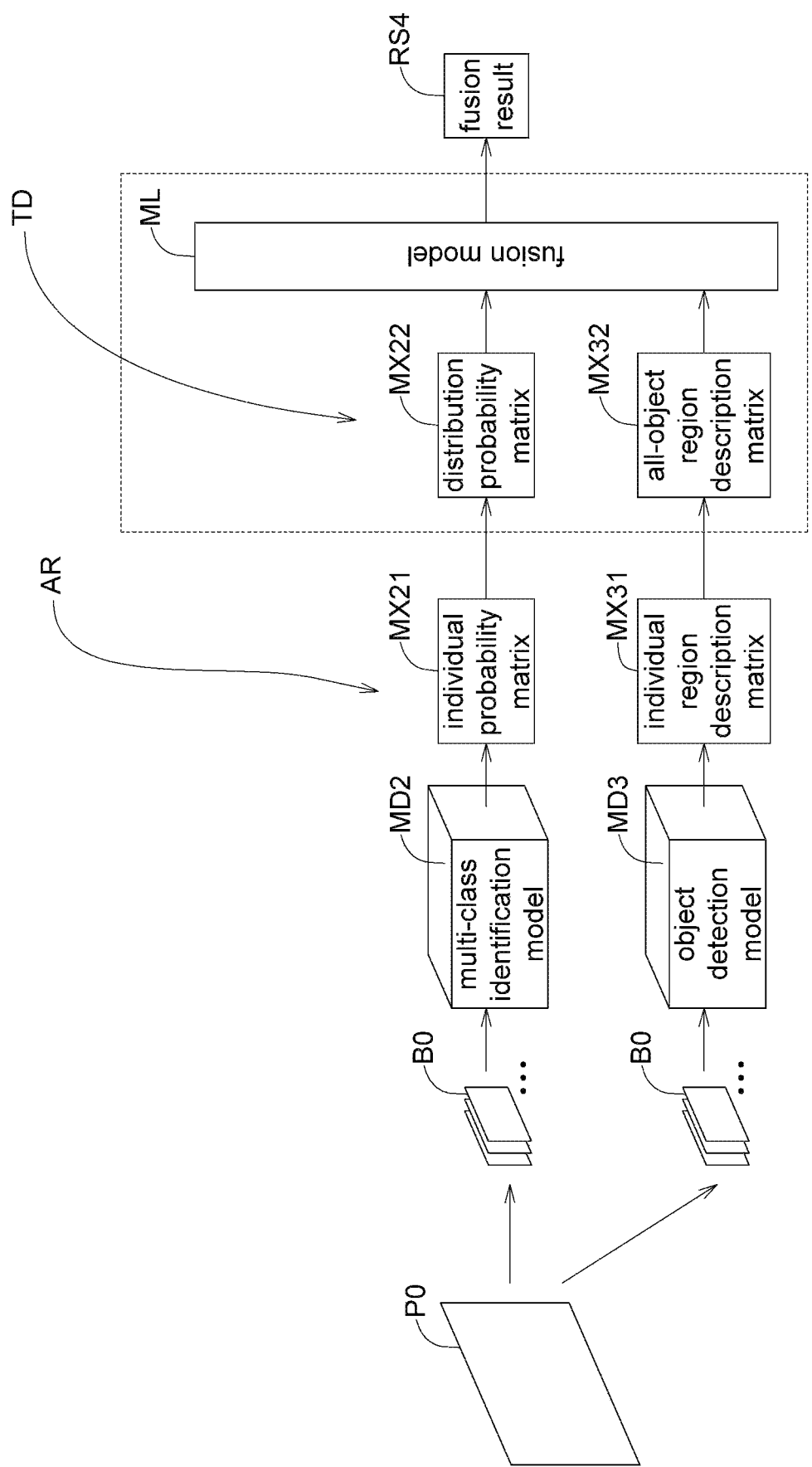
FIG. 9 is an implementation architecture of a neural network model fusion method according to another embodiment.

Apart from the embodiments disclosed above, the neural network model fusion method of the present disclosure can also be used in the fusion of different models. Referring to FIG. 7, an implementation architecture of a neural network model fusion method according to another embodiment is shown. The neural network model fusion method of the present disclosure can also be used to fuse the degree classification model MD1 and the multi-class identification model MD2 to obtain a fusion result RS2. Referring to FIG. 8, an implementation architecture of a neural network model fusion method according to another embodiment is shown. The neural network model fusion method of the present disclosure can also be used to fuse the degree classification model MD1 the object detection model MD3 to obtain a fusion result RS3. Referring to FIG. 9, an implementation architecture of a neural network model fusion method according to another embodiment is shown. The neural network model fusion method of the present disclosure can also be used to fuse the multi-class identification model MD2 the object detection model MD3 to obtain a fusion result RS4.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A neural network model fusion method, comprising:
receiving an image;
analyzing the image through a plurality of neural network models comprising at least two of a degree classification model, a multi-class identification model and an object detection model;
obtaining a plurality of analysis results according to the neural network models;
converting the analysis results into a plurality of conversion factors; and
inputting the conversion factors into a fusion model to obtain a fusion result;
wherein the neural network models comprises the degree classification model, the analysis results of the degree classification model are presented as a distribution probability matrix of a plurality of levels, the distribution probability matrix has a plurality of distribution probability values whose sum adds up to 1, and the distribution probability matrix is element-wise multiplied by a weight matrix to obtain a weighted probability matrix used as the conversion factors of the degree classification model.

2. The neural network model fusion method according to claim 1, wherein each of the analysis results of the degree classification model is a classification result of disease severity.

3. The neural network model fusion method according to claim 1, wherein the neural network models comprise the multi-class identification model, the analysis results of the multi-class identification model are presented as an individual probability matrix of a plurality of classes, the individual probability matrix has a plurality of individual probabilities each having a value between 0.0 to 1.0, the individual probability matrix is converted into a distribution probability matrix of a plurality of levels through a conversion model, and the distribution probability matrix is used as the conversion factors of the multi-class identification model.

4. The neural network model fusion method according to claim 3, wherein the quantity of the levels of the distribution probability matrix of the multi-class identification model is the same as that of the distribution probability matrix of the degree classification model.

5. The neural network model fusion method according to claim 3, wherein each of the analysis results of the multi-class identification model is a multi-lesion classification result.

6. The neural network model fusion method according to claim 1, wherein the neural network models comprise the multi-class identification model, the analysis results of the multi-class identification model are presented as an individual probability matrix of a plurality of classes, the individual probability matrix is converted into a distribution probability matrix of a plurality of levels through a correspondence table, and the distribution probability matrix is used as the conversion factors of the multi-class identification model.

7. The neural network model fusion method according to claim 6, wherein the quantity of the levels of the distribution probability matrix of the multi-class identification model is the same as that of the distribution probability matrix of the degree classification model.

8. The neural network model fusion method according to claim 1, wherein the neural network models comprise the object detection model, the analysis results of the object detection model are presented as at least one individual region description matrix of a plurality of objects, the at least one individual region description matrix is converted into an all-object region description matrix of the objects, and the all-object region description matrix is used as the conversion factors of the object detection model.

9. The neural network model fusion method according to claim 8, wherein each of the analysis results of the object detection model is a lesion detection result.

10. An electronic device, comprising:
a processor configured to perform a neural network model fusion method, which comprises:
receiving an image;
analyzing the image through a plurality of neural network models comprising at least two of a degree classification model, a multi-class identification model and an object detection model;
obtaining a plurality of analysis results according to the neural network models;
converting the analysis results into a plurality of conversion factors; and
inputting the conversion factors into a fusion model to obtain a fusion result;
wherein the neural network models comprises the degree classification model, the analysis results of the degree classification model are presented as a distribution probability matrix of a plurality of levels, the distribution probability matrix has a plurality of distribution probability values whose sum adds up to 1, and the distribution probability matrix is element-wise multiplied by a weight matrix to obtain a weighted probability matrix used as the conversion factors of the degree classification model.

11. The electronic device according to claim 10, wherein each of the analysis results of the degree classification model is a classification result of disease severity.

12. The electronic device according to claim 10, wherein the neural network models comprise the multi-class identification model, the analysis results of the multi-class identification model are presented as an individual probability matrix of a plurality of classes, the individual probability matrix has a plurality of individual probabilities each having a value between 0.0 to 1.0, the individual probability matrix is converted into a distribution probability matrix of a plurality of levels through a conversion model, and the distribution probability matrix is used as the conversion factors of the multi-class identification model.

13. The electronic device according to claim 12, wherein a quantity of the levels of the distribution probability matrix of the multi-class identification model is the same as that of the distribution probability matrix of the degree classification model.

14. The electronic device according to claim 12, wherein each of the analysis results of the multi-class identification model is a multi-lesion classification result.

15. The electronic device according to claim 10, wherein the neural network models comprise the multi-class identification model, the analysis results of the multi-class identification model are presented as an individual probability matrix of a plurality of classes, the individual probability matrix is converted into a distribution probability matrix of a plurality of levels through a correspondence table, and the distribution probability matrix is used as the conversion factors of the multi-class identification model.

16. The electronic device according to claim 15, wherein the quantity of the levels of the distribution probability matrix of the multi-class identification model is the same as that of the distribution probability matrix of the degree classification model.

17. The electronic device according to claim 10, wherein the neural network models comprise the object detection model, the analysis results of the object detection model are presented as at least one individual region description matrix of a plurality of objects, the at least one individual region description matrix is converted into an all-object region description matrix of the objects, and the all-object region description matrix is used as the conversion factors of the object detection model.

18. The electronic device according to claim 17, wherein each of the analysis results of the object detection model is a lesion detection result.

* * * * *